UNITED STATES PATENT OFFICE.

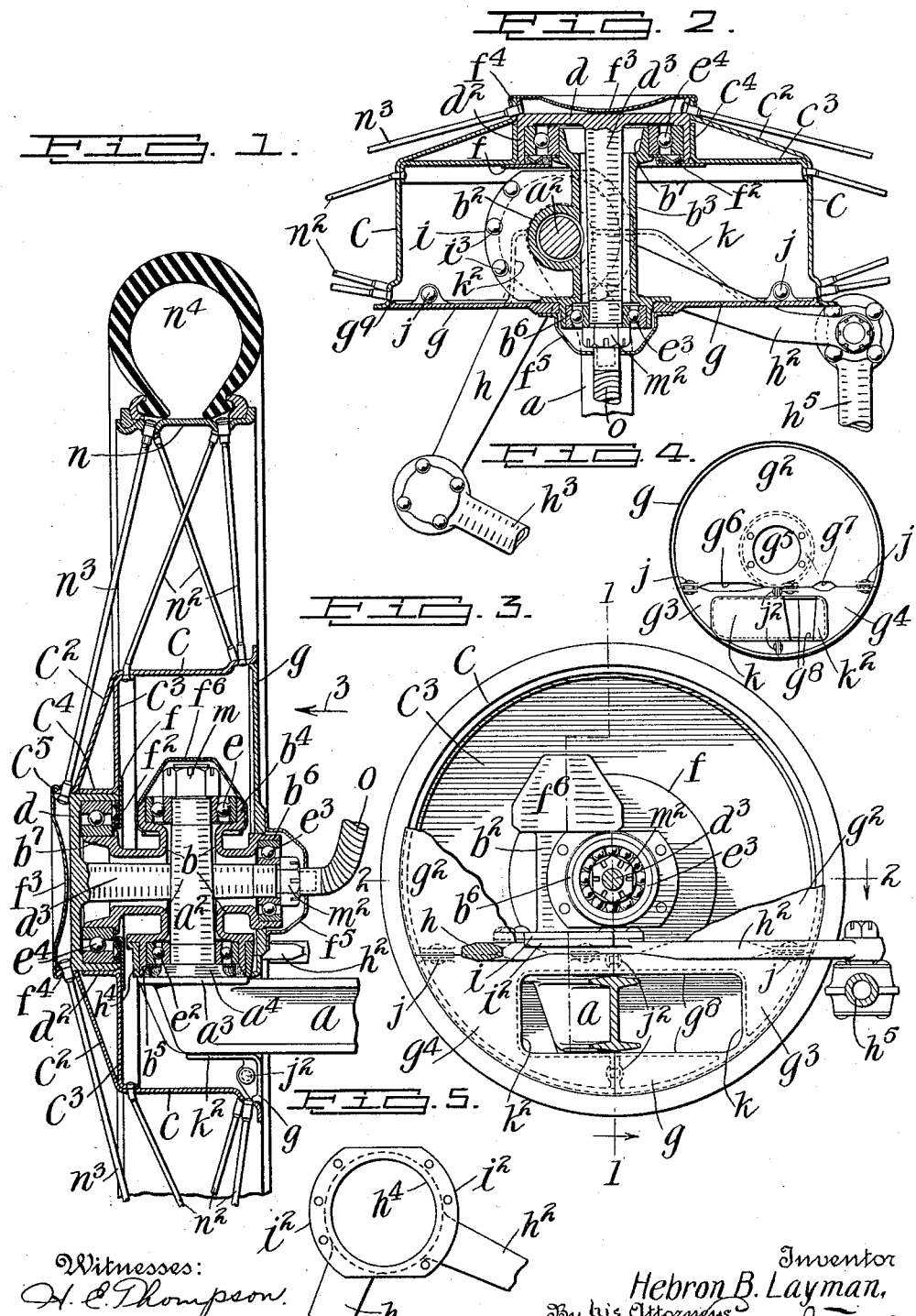

HEBRON B. LAYMAN, OF NEW YORK, N. Y., ASSIGNOR OF ONE-HALF TO FRANK E. LONAS, OF NEW YORK, N. Y.

FRONT WHEEL FOR AUTOMOBILES.

1,142,335.  Specification of Letters Patent.  Patented June 8, 1915.

Application filed October 6, 1913. Serial No. 793,546.

*To all whom it may concern:*

Be it known that I, HEBRON B. LAYMAN, a citizen of the United States, and residing at New York, in the county of New York and State of New York, have invented certain new and useful Improvements in Front Wheels for Automobiles, of which the following is a specification, such as will enable those skilled in the art to which it appertains to make and use the same.

This invention relates to front or steering wheels for automobiles or power driven vehicles, and the object of the invention is to provide an improved front wheel and axle construction for vehicles of this class which possesses the greatest possible strength and endurance in proportion to the weight thereof; a further object being to provide a front wheel and axle construction for power driven vehicles involving improved means for turning the wheel in the operation of guiding the vehicle; a still further object being to provide a wheel and axle construction of the class specified in which the axle is provided with a vertical spindle and the wheel proper with a horizontal spindle, which passes through a spindle box mounted on the spindle of the axle, said spindle box and wheel being adapted to oscillate on the spindle of the axle, and the construction and arrangement being such that a line drawn vertically through the axle spindle would strike the ground on which the wheel rests forward of the point at which a line drawn vertically through the center portion of the wheel and the wheel spindle would strike the ground thus producing what is called a caster wheel; and with these and other objects in view, the invention consists in a wheel and axle mechanism for power driven vehicles constructed and operating as hereinafter described and claimed.

The invention described and claimed herein is also an improvement on that described and claimed in an application for Letters Patent of the United States filed by me April 25, 1913, Serial No. 763,483, and said invention is fully disclosed in the following specification of which the accompanying drawing forms a part, in which the separate parts of my improvement are designated by suitable reference characters in each of the views, and in which:—

Figure 1 is a section taken on the line 1—1 of Fig. 3;—Fig. 2 a section on the line 2—2 of Fig. 3;—Fig. 3 an inside view of the wheel looking in the direction of the arrow 3 of Fig. 1, and showing part of the construction broken away;—Fig. 4 an inside view of a sub-divided inner wheel hub casing plate which I employ, and;—Fig. 5 a detail view of the steering arms detached from the wheel.

In the drawing forming part of this specification, I have shown at $a$ one end of the front axle of an automobile or power driven vehicle provided with a vertical and upwardly directed spindle $a^2$ at right angles thereto and at the base of which is an annular flange $a^3$ above which is an annular shoulder $a^4$, and mounted on the spindle $a^2$ and adapted to oscillate horizontally thereon is a spindle box $b$ having a vertical casing $b^2$ through which the axle spindle $a^2$ passes and a horizontal casing $b^3$ through which the spindle of the wheel passes, as hereinafter described, and it will be observed, that the casing $b^3$ through which the spindle of the wheel passes is back of and at right angles to the casing $b^2$ through which the axle spindle passes.

The wheel proper comprises an annular drum or drum-shaped hub portion $c$, the outer side of which is closed by a conical or convex outer hub plate $c^2$ within which is placed a supplemental hub plate $c^3$ at right angles to the plate $c$ and secured thereto, and the supplemental hub plate $c^3$ is provided with a central annular drum $c^4$, and the outer hub plate $c^2$ is provided with a central opening $c^5$ which corresponds with the drum $c^4$ of the hub plate $c^3$, and these parts $c^2$ and $c^3$ are rigidly secured together and form a support for a spindle head $d$ having an inwardly directed flange or rim $d^2$, and rigidly secured in the parts $c^2$, $c^3$ and $c^4$.

The spindle head $d$ carries the wheel spindle $d^3$ which passes inwardly through the supplemental casing $b^3$ and the spindle casing $b^2$ through which the axle spindle $a^2$ passes is provided at the top and bottom thereof with enlarged head portions $b^4$ and $b^5$ in which are placed ball bearings $e$ and $e^2$ of any preferred construction, and the spindle casing $b^3$ through which the wheel spindle $d^3$ passes is provided at the inner and outer ends thereof with enlarged head portions $b^6$ and $b^7$ between which and the inner end of the wheel spindle casing and the rim of the head of the wheel spindle are placed ball bearings $e^3$ and $e^4$.

The ball bearings $e^4$ are covered on the inner side thereof by a plate $f$ secured to the inner side of the plate $c^3$ and between which and said bearings is placed an annular packing $f^2$ to retain the lubricating material applied to the bearings $d$ and also to prevent dust from getting into said bearings.

The spindle head $d$ is inclosed by a plate $f^3$ connected with or secured to an annular flange member $f^4$ on the hub plate $c^2$ and surrounding the spindle head $d$; and the inner end of the spindle $d^3$ and the bearings $e^3$ are inclosed by a detachable cap plate $f^5$, and the end of the axle spindle $a^2$ and the bearings $e$ are inclosed by the detachable cap $f^6$ and the hub or hub member $c$ of the wheel is inclosed on its inner side by a detachable plate $g$ which is sub-divided, or consists of three separate parts $g^2$, $g^3$, and $g^4$, and of the said parts, the part $g^2$ is the largest and is provided with a central aperture $g^5$ through which the wheel spindle $d^3$ passes, and between the parts $g^3$ and $g^2$ and $g^4$ and $g^2$ are two elongated apertures $g^6$ and $g^7$ through which steering arms $h$ and $h^2$ pass, and formed in the parts $g^3$ and $g^4$ of the plate $g$ is a large elongated aperture $g^8$ through which the axle $a$ passes.

The steering rod $h^3$ which is operated in the usual way, by the driver of the car, is connected with the arm $h$, and said arm $h$ passes through the aperture $g^7$ in the plate $g$ and is provided with an annular head $h^4$ mounted on the enlarged bottom head portion $b^5$ of the axle spindle casing $b^2$, and the arm $h^2$ passes through the aperture $g^6$ in the plate $g$ and is also connected with the annular head $h^4$, and connected with the arm $h^2$ is a rod $h^5$ which extends transversely of the vehicle and connects in the same manner with the corresponding steering arm of the opposite wheel, which is not shown, and the enlarged head portion $b^5$ at the bottom of the casing $b^2$ of the axle spindle is provided on the opposite sides thereof with flanges $i$, and the head $h^4$ of the arms $h$ and $h^2$ is provided with corresponding flanges $i^2$, and said parts are secured together by screws or bolts $i^3$.

The parts $g^3$ and $g^4$ of the plate $g$ are provided with inwardly directed pockets $k$ and $k^2$ which inclose the inner end of the axle $a$ while permitting the wheel and spindle box to swing horizontally on said axle, and the object of which is to prevent dust, dirt and the like from entering the hub member $c$ and the bearings of the spindle box.

The parts $g^3$ and $g^4$ of the plate $g$ are connected with the part $g^2$ by means of inwardly directed ears and rivets passed therethrough, as shown at $j$, and the parts $g^3$ and $g^4$ of the plate $g$ are connected by corresponding ears and rivets $j^2$, and the perimeter of the plate $g$ is slightly beveled so that it will fit snugly in the inner arm of the hub or drum member $c$, as shown at $g^9$, and the object of making the plate $g$ of separate parts as shown and described is to provide means whereby said plate may be easily placed in position.

The axle spindle $a^2$ is provided with a nut $m$ and the wheel spindle $d^3$ with a nut $m^2$, and in the construction shown, the cap plates $f^3$ and $f^6$ are sprung into position and may be detached when desired, or said cap plates may be secured in any desired manner, and the cap plate $f^5$ may also be detachably secured in position in any preferred way, but it will be observed that said cap plate is provided with a base flange which overlaps the central portion of the plate $g$.

The rim portion $n$ of the wheel may be of any preferred form or construction, and is connected with the hub or drum member $c$ by spokes $n^2$ and said rim member is also connected with the outer hub portion of the wheel formed by the parts $c^2$ and $c^3$, by spokes $n^3$, and said rim member is also provided with any suitable tire $n^4$.

In assembling the parts of my improved wheel, the spindle box $b$ is first dropped into position on the axle spindle $a^2$, after which the drum or hub member $c$ with the rim $n$ connected therewith and the spindle head $d$ with its spindle $d^3$ all assembled, or placed in position, on the spindle box by passing the spindle $d^3$ through said box, after which the plate $g$ is placed in position, or said plate $g$ may first be placed in position, after which the wheel members $c$, $n$, $d$ and $d^3$, assembled as shown and described, may be placed in position.

By mounting the separate parts of my improved wheel and axle construction, as shown and described, and providing the wheel proper with a central horizontal free rotating spindle having a free inner end, I provide means whereby a speedometer may be driven from, or operated by said spindle, and for this purpose I connect with the inner end of the wheel spindle $d^3$, a flexible shaft $o$ which may be used for the purpose of driving or operating a speedometer mounted or supported in the usual manner, and the flexible shaft $o$ may be connected directly with the end of the spindle or with the nut $m^2$ mounted thereon, and in this way, I solve in a simple and effective manner the problem of operating a speedometer.

The axle spindle $a^2$ may be formed integrally with the axle $a$, or it may be formed separately therefrom and be detachably or otherwise connected therewith in any desired manner, and while I have shown and described the preferred construction of my improved wheel and axle mechanism in detail, it will be understood that my invention is not limited to the exact details herein shown and described, and changes therein and modifications thereof may be made, within the scope of the appended claims, without departing from the spirit of my invention or sacrificing its advantages.

Having fully described my invention what I claim as new and desire to secure by Letters Patent is;—

1. In a wheel and axle construction, an axle provided at its end with an upwardly directed spindle, a spindle box mounted on said spindle, and adapted to oscillate in a horizontal plane, a wheel member mounted on said spindle box and inclosing the same and provided centrally of its outer side with a spindle head having a spindle which passes inwardly through said box and a flexible shaft connected with the inner end of said spindle for operating a speedometer.

2. In a wheel and axle construction, an axle provided with a vertical upwardly directed end spindle, a spindle box mounted thereon above the axle and adapted to oscillate in a horizontal plane, said spindle box being provided with a central horizontal wheel spindle casing and a vertical axle spindle casing in front thereof and through which the spindle of the axle passes, and a wheel member mounted on and rotatable on the spindle box and adapted to oscillate horizontally therewith and provided with a spindle which passes inwardly horizontally through the wheel spindle casing of the spindle box, said wheel member comprising a central annular drum portion and a rim portion connected therewith, the drum portion being closed on its outer side by a plate centrally of which is secured a spindle head which incloses the outer end of the spindle box and rotates thereon and with which the wheel spindle is connected and being closed on its inner side by a detachable plate composed of separate parts.

3. In a wheel and axle construction, an axle provided with a vertical upwardly directed end spindle, a spindle box mounted thereon above the axle and adapted to oscillate in a horizontal plane, said spindle box being provided with a central horizontal wheel spindle casing and a vertical axle spindle casing in front thereof and through which the spindle of the axle passes, and a wheel member mounted on and rotatable on the spindle box and adapted to oscillate horizontally therewith and provided with a spindle which passes inwardly horizontally through the wheel spindle casing of the spindle box, said wheel member comprising a central annular drum portion and a rim portion connected therewith, the drum portion being closed on its outer side by a plate with which the wheel spindle is connected and being closed on its inner side by a detachable plate composed of separate parts and through which the inner end of the wheel spindle casing of the spindle box passes.

4. In a wheel and axle construction, an axle provided with a vertical upwardly directed end spindle, a spindle box mounted thereon above the axle and adapted to oscillate in a horizontal plane, said spindle box being provided with a central horizontal wheel spindle casing and a vertical axle spindle casing in front thereof and through which the spindle of the axle passes, and a wheel member mounted on and rotatable on the spindle box and adapted to oscillate horizontally therewith and provided with a spindle which passes inwardly horizontally through the wheel spindle casing of the spindle box, said wheel member comprising a central annular drum portion and a rim portion connected therewith, the drum portion being closed on its outer side by a plate with which the wheel spindle is connected and being closed on its inner side by a detachable plate composed of separate parts and through which the inner end of the wheel spindle casing of the spindle box passes, the inner end of the wheel spindle casing being also closed by a detachable cap and a flexible shaft which passes through said cap and is connected with the inner end of the wheel spindle.

5. In a wheel and axle construction of the class described, an axle provided with a wheel spindle support adapted to oscillate horizontally, a wheel member mounted thereon and provided on its outer side with a wheel spindle which passes centrally and inwardly through said support, the inner side of said wheel member being provided with a detachable plate composed of separate parts and provided centrally with an opening in line with said spindle, a flexible shaft connected with the inner end of said spindle for operating a speedometer and passing through said opening and other openings through which the axle and steering arm pass.

6. In a wheel and axle construction of the class described, an axle provided with a vertical upwardly directed end spindle, a spindle box mounted thereon above the axle and adapted to oscillate in a horizontal plane, a wheel provided with a central hub or drum member mounted on the spindle box, the inner side of the hub or drum member being inclosed by a detachable plate composed of separate detachably connected parts, and steering arms connected with said spindle box and passing through apertures in said plate, said plate being also provided with an elongated opening through which the axle passes.

7. In a wheel and axle construction of the class described, an axle provided with a vertical end spindle, a spindle box mounted on said spindle above the axle and adapted to oscillate in a horizontal plane, and a wheel mounted on the spindle box and provided with a spindle which passes inwardly through the spindle box back of the axle spindle and parallel with the axle, said wheel being provided with a central hub or drum member the inner side of which is inclosed by a detachable plate composed of separate detachably connected parts, and steering arms connected with said spindle box and passing through apertures in said plate, said plate being also provided with an elongated aperture through which the axle passes.

8. In a wheel and axle construction, an axle provided with a vertical upwardly directed end spindle, a spindle box mounted thereon above the axle and adapted to oscillate in a horizontal plane, said spindle box being provided with a central horizontal wheel spindle casing and a vertical axle spindle casing in front thereof and through which the spindle of the axle passes, and a wheel member mounted on and rotatable on the spindle box and adapted to oscillate horizontally therewith and provided with a spindle which passes inwardly horizontally through the wheel spindle casing of the spindle box, said wheel member comprising a central annular drum portion and a rim portion connected therewith, the drum portion being closed on its outer side by a plate with which the wheel spindle is connected and being closed on its inner side by a detachable plate and through which the inner end of the wheel spindle casing of the spindle box passes.

In testimony that I claim the foregoing as my invention I have signed my name in presence of the subscribing witnesses this 4th day of October 1913.

HEBRON B. LAYMAN.

Witnesses:
FRANK E. LONAS,
S. ANDREWS.

Copies of this patent may be obtained for five cents each, by addressing the "Commissioner of Patents, Washington, D. C."